(12) United States Patent
Saito et al.

(10) Patent No.: US 8,211,311 B2
(45) Date of Patent: Jul. 3, 2012

(54) METHOD FOR TREATING SHIP BALLAST WATER WITH MEMBRANE

(75) Inventors: Masahiro Saito, Tokyo (JP); Toshio Sano, Tokyo (JP)

(73) Assignee: Mitsui Engineering & Shipbuilding Co., Ltd., Tokyo (JP)

( * ) Notice: Subject to any disclaimer, the term of this patent is extended or adjusted under 35 U.S.C. 154(b) by 366 days.

(21) Appl. No.: 12/532,927

(22) PCT Filed: Mar. 19, 2008

(86) PCT No.: PCT/JP2008/055102
§ 371 (c)(1),
(2), (4) Date: Sep. 24, 2009

(87) PCT Pub. No.: WO2008/123107
PCT Pub. Date: Oct. 16, 2008

(65) Prior Publication Data
US 2010/0101998 A1  Apr. 29, 2010

(30) Foreign Application Priority Data
Mar. 30, 2007 (JP) .................................. 2007-095699

(51) Int. Cl.
*B01D 61/14* (2006.01)
*B01D 61/16* (2006.01)
*B01D 37/02* (2006.01)

(52) U.S. Cl. ......... 210/650; 210/777; 210/778; 210/636

(58) Field of Classification Search ........................ None
See application file for complete search history.

(56) References Cited

U.S. PATENT DOCUMENTS
5,919,374 A  7/1999 Harvey et al.

FOREIGN PATENT DOCUMENTS

| JP | 3133947 A | 6/1991 |
|----|-----------|--------|
| JP | 4322788 A | 11/1992 |
| JP | 11319518 A | 11/1999 |
| JP | 2004160437 A | 6/2004 |
| JP | 2006000729 A * | 1/2006 |
| JP | 20060239530 A * | 9/2006 |
| JP | 2007038172 A * | 2/2007 |
| WO | WO 2007130029 A1 * | 11/2007 |

* cited by examiner

*Primary Examiner* — Krishnan S Menon
(74) *Attorney, Agent, or Firm* — K. David Crockett, Esq.; Niky Economy Syrengelas, Esq.; Crockett & Crockett, PC

(57) ABSTRACT

A method for treating ship ballast water with a membrane, which can easily separate and reliably remove a fouling substance attached to a membrane and maintain the membrane flux for long periods.
The method including a membrane separation step of taking in seawater in a port area in which a ship is anchored and separating a microorganism with a size equal to or greater than a predetermined size therefrom with a membrane filtration apparatus installed in or on a hull of the ship and having a filtration membrane module, a backwash step of separating a fouling substance attached to a membrane surface of the membrane filtration apparatus from the membrane surface by backwashing is provided.

5 Claims, 1 Drawing Sheet

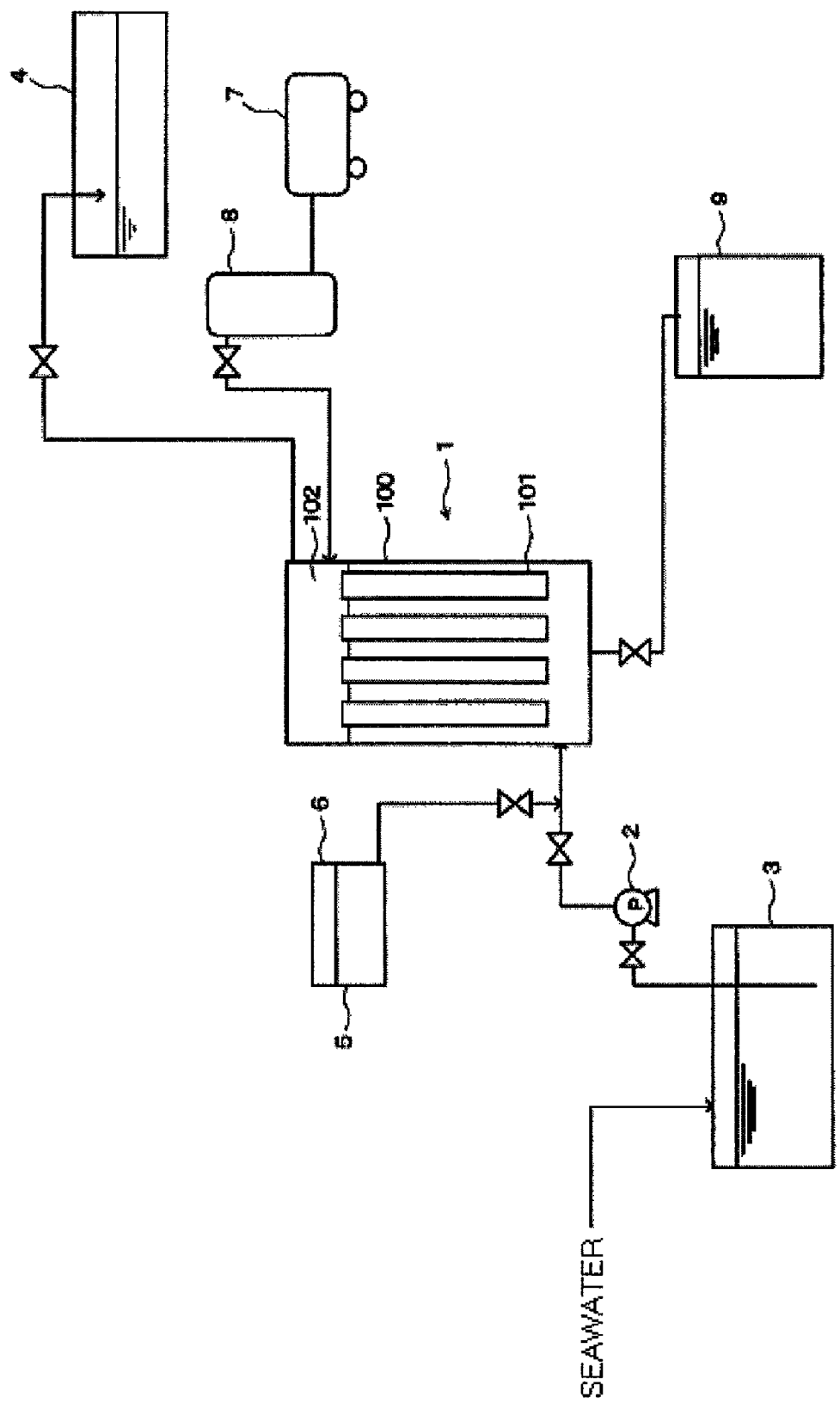

METHOD FOR TREATING SHIP BALLAST WATER WITH MEMBRANE

TECHNICAL FIELD

The present invention relates to methods for treating ship ballast water with a membrane, and more particularly to a method for treating ship ballast water with a membrane, which can reliably separate fouling substances (a mineral and a gel-like substance) attached to a membrane and maintain the membrane flux for long periods.

BACKGROUND OF THE INVENTIONS

A cargo ship transporting crude oil or the like has ballast tanks for maintaining the stability of a hull during navigation. Usually, the ballast tanks are filled with ballast water when the ship is not loaded with crude oil or the like, and the ballast water is discharged when crude oil or the like is loaded into the ship. In this way, the buoyancy of the hull is adjusted to stabilize the hull. As described above, the ballast water is water required for safe navigation of the ship, and normally seawater at a port where cargo handling is carried out is used. The amount thereof is estimated to be over 10 billion tons per year on a worldwide basis.

Incidentally, the ballast water contains microorganisms or eggs of small and large organisms, which inhabit port where the ballast water was taken in. As the ship moves, such microorganisms or eggs of small and large organisms are also transported to foreign countries. Therefore, the destruction of the ecosystem caused as a result of organism species which do not originally inhabit a sea area replacing existing organism species is getting serious.

Against this background, a diplomatic conference of the International Maritime Organization (IMO) has adopted an obligation to conduct regular inspections on ballast water treatment equipment and the like, and this obligation is applied to ships constructed after 2009.

Moreover, the discharge standard (G8) set forth in Regulation D-2 of the Convention for the Control and Management of Ships' Ballast Water and Sediments (hereinafter referred to as the Convention) is as follows: plankton with a size of 10 to 50 μm must be 10 cells/ml, plankton with a size of 50 μm or more must be 10 cells/m$^3$, *Escherichia coli* with a size of 0.5 to 3 μm must be 250 cfu/100 ml, *Vibrio cholerae* with a size of 0.5 to 3 μm must be 1 cfu/100 ml, and *Enterococcus* with a size of 0.5 to 3 μm must be 100 cfu/100 ml.

Furthermore, according to the Procedure for approval of ballast water management systems that make use of active substances (G9), which was adopted on Jul. 22, 2005, the objective of the Procedure is to determine the acceptability of active substances and preparations containing one or more active substances and their application in ballast water management systems concerning ship safety, human health, and the aquatic environment. According to G9, an active substance means a substance or organism, including a virus or a fungus that has a general or specific action on or against harmful aquatic organisms and pathogens, and the Procedure requires toxicity testing for verification.

Against this backdrop, extremely strict sterilization or bacterial eradication is required to meet the requirements of G8 and G9.

As the ballast water sterilization/bacterial eradication technology, a technique described in Patent Document 1 is conventionally known as an ozone-based chemical method.

Patent Document 1 proposes a technique of performing sterilization by injecting ozone into ballast water in conjunction with an injection of steam while reducing ozone usage by turning the ozone into microscopic bubbles and thereby promoting the generation of hydroxyl radicals.

However, the reduction of ozone usage has its limit. As a result, research is rapidly going on to adopt membrane treatment.

Many gel-like substances of biological origin exist in ballast water (seawater), and, when the ballast water is subjected to membrane treatment by using a membrane module, these substances may accumulate on the membrane surface in prolonged operation. The problem is that these gel-like substances firmly attach to the membrane surface, and are difficult to remove even when the membrane is backwashed.

Therefore, in the membrane treatment method, anti-fouling measures become important to prolong the membrane treatment time. As the anti-fouling measures taken at the time of membrane treatment, in Patent Document 2, a technique of performing membrane cleaning by using an enzyme and a technique of performing membrane cleaning by using an enzyme and an oxidizer in combination are disclosed. In Patent Document 3, a technique of performing membrane cleaning by using ethylenediaminetetraacetic acid tetrasodium tetrahydrate is disclosed.

Moreover, as a method in which membrane treatment is not performed, a method in which treatment is performed with iodine is disclosed in Patent Document 4, and a method in which treatment is performed with sodium hypochlorite is disclosed in Patent Document 5.

Patent Document 1: JP-A-2004-160437
Patent Document 2: JP-A-3-133947
Patent Document 3: JP-A-11-319518
Patent Document 4: JP-T-2002-504851
Patent Document 5: JP-A-4-322788

SUMMARY

Since the techniques described in Patent Documents 2 to 5 use some kind of chemical, an impact on the ecosystem has to be taken into consideration when treated water is discharged into a port area from which seawater was supplied. Moreover, the problem is that a large amount of agent has to be used for neutralization or the like when treatment is performed on the ship.

Therefore, an object of the present invention is to provide a method for treating ship ballast water with a membrane, which can easily separate and reliably remove a fouling substance attached to a membrane and maintain the membrane flux for long periods.

Also, other objects of the present invention will become apparent from the following description.

The above problem is solved by the invention set forth below.

The invention according to claim 1 is a method for treating ship ballast water with a membrane, the method including a membrane separation step of taking in seawater in a port area in which a ship is anchored and separating a microorganism with a size equal to or greater than a predetermined size therefrom with a membrane filtration apparatus installed in or on a hull of the ship and having a filtration membrane module, wherein the method includes a backwash step of separating a fouling substance attached to a membrane surface of the membrane filtration apparatus from the membrane surface by backwashing.

The invention according to claim 2 is the method for treating ship ballast water with a membrane according to claim 1, wherein, before membrane separation treatment is performed on the seawater in the membrane separation step, the method includes a sand mixing step of mixing sand into the seawater.

The invention according to claim 3 is the method for treating ship ballast water with a membrane according to claim 2, wherein, in the sand mixing step, sand collected from the port area in which the ship is anchored is mixed into the seawater.

The invention according to claim 4 is the method for treating ship ballast water with a membrane according to claim 3, wherein the sand contained in the water discharged after backwashing in the backwash step is sterilized by sterilization and is reused.

The invention according to claim 5 is the method for treating ship ballast water with a membrane according to any one of claims 1 to 4, wherein the filtration membrane module of the membrane filtration apparatus is a microfiltration membrane module.

The invention according to claim 6 is the method for treating ship ballast water with a membrane according to any one of claims 1 to 5, wherein the filtration membrane module of the membrane filtration apparatus is a pleated membrane module.

According to the present invention, it is possible to provide a method for treating ship ballast water with a membrane, which can easily separate and reliably remove a fouling substance attached to a membrane and maintain the membrane flux for long periods.

BRIEF DESCRIPTION OF DRAWINGS

The Figure is an exemplary diagram showing an example of an apparatus performing a method for treating ship ballast water with a membrane in accordance with the present invention.

| EXPLANATIONS OF LETTERS OR NUMERALS | |
|---|---|
| 1: | membrane filtration apparatus |
| 100: | membrane apparatus body |
| 101: | membrane |
| 102: | water collecting part |
| 2: | pump |
| 3: | circulating tank |
| 4: | treated water tank |
| 5: | sand |
| 6: | sand tank |
| 7: | compressor |
| 8: | backwash air tank |
| 9: | backwash discharged water tank |

DETAILED DESCRIPTION OF INVENTIONS

Hereinafter, an embodiment of the present invention will be explained by using the drawing.

The Figure is an explanatory diagram showing an example of an apparatus performing a method for treating ballast water with a membrane in accordance with the present invention. In this drawing, 1 denotes a membrane filtration apparatus installed in or on a hull of a ship, and the membrane filtration apparatus is schematically shown.

100 denotes a membrane apparatus body (filtration membrane module), and 101 denotes a membrane. As the membrane 101 used in the membrane filtration apparatus 1, a membrane that meets the above-mentioned standard set forth in G8: plankton with a size of 10 to 50 μm must be 10 cells/ml, plankton with a size of 50 μm or more must be 10 cells/m$^3$, *Escherichia coli* with a size of 0.5 to 3 μm must be 250 cfu/100 ml, *Vibrio cholerae* with a size of 0.5 to 3 μm must be 1 cfu/100 ml, and *Enterococcus* with a size of 0.5 to 3 μm must be 100 cfu/100 ml can be used.

In the present invention, as a filtration membrane module of the membrane filtration apparatus, a microfiltration membrane module is suitably used. Since the microfiltration membrane (abbreviated as MF membrane) module can separate particles, microorganisms, and bacterial bodies (plankton, *Escherichia coli*, *Vibrio cholerae*, and *Enterococcus*) which are greater than 0.1 μm, the microfiltration membrane module is preferable in order to achieve the object of the present invention.

Moreover, as a membrane structure, a pleated membrane module having a large surface area is preferable because it can reduce the installation area.

In an example shown in the drawing, a plurality of pleated microfiltration membrane modules are provided in the apparatus body 100, and seawater is introduced from outside the membrane and is filtered through the membrane, whereby treated water is obtained.

That is, seawater in a circulating tank 3 is supplied to the apparatus body 100 with a pump 2. Pressure is applied to the supplied seawater in the body 100, and the seawater is filtered through the membrane by that pressure. The filtered water is conveyed to a ballast tank 4 via a water collecting part 102.

In the present invention, when seawater is supplied to the apparatus body 100, a specific amount of sand 5 is added to the seawater from a sand tank 6.

When membrane treatment is performed continuously for a long time, a gel-like substance contained in the seawater attaches to the membrane surface, causing a decline in flux. This makes it impossible to continue filtration. In the present invention, to remove the attached gel-like substance, a specific amount of sand 5 is supplied from the sand tank 6 to the seawater to be supplied to the apparatus body.

The sand 5 attaches to the surface of the filtration membrane while catching the gel-like substance. When the microfiltration membrane is used, a backwash process of cleaning the filtration membrane by backwashing is performed at a fixed time interval. As time passes, the sand in which the gel-like substance causing clogging of the membrane is caught attaches to the membrane surface, and the transmembrane pressure difference between an entrance and an exit of the membrane increases.

When the transmembrane pressure difference increases, filtration of seawater is stopped, and the filtration membrane is backwashed. By performing the backwash process, the filtration function of the filtration membrane is restored. After the backwash process is ended, the filtration process of treating the seawater is resumed. By performing these processes repeatedly, filtration can be performed for long periods of time.

Incidentally, backwashing is performed by supplying air to the apparatus body at a stroke with a compressor 7 from a backwash air tank 8 kept at a constant pressure. The supplied air and the seawater present in the apparatus body are introduced into a backwash discharged water tank 9 together with the sand, in which the gel-like substance is caught, attached to the membrane surface. Incidentally, the seawater and the sand in which the gel-like substance is caught, the seawater and the sand introduced into the backwash discharged water tank 9, may be treated as follows.

It is preferable to separate them into seawater and sand by a microfiltration membrane apparatus or the like which is different from the apparatus body 100, discharge the seawater into a port area, and reuse the sand after sterilizing it by sterilization such as heat treatment.

Moreover, it is preferable to use the sand collected from a port area in which the ship is anchored. In that case, it is possible to discharge the sand directly into the port area.

In the present invention, the particle size of the sand added to the seawater is preferably in the range of 5 to 1000 µm, and the amount of added sand is preferably in the range of 50 to 10000 mg/L.

EXAMPLES

Hereinafter, the present invention will be explained by way of examples; however, the present invention is not limited to the examples described below.

Example 1

Seawater was filtered through a membrane by using a membrane filtration apparatus (pleated microfiltration membrane: model number BW-40BN; flux 10 m/day) of the present invention. The concentrations of microorganisms and bacteria in the seawater and filtered water were measured. The results are shown in Table 1.

TABLE 1

|  | Raw water | Filtered water |
| --- | --- | --- |
| Plankton with a size of 10 to 50 µm | 100 to 300 cells/ml | ND |
| Plankton with a size of 50 µm or more | 150 to 300 cells/m$^3$ | ND |
| *Escherichia coli* with a size of 0.5 to 3 µm | 100 to 5000 cfu/100 ml | ND |
| *Vibrio cholerae* with a size of 0.5 to 3 µm | 10 cfu/100 ml | ND |
| *Enterococcus* with a size of 0.5 to 3 µm | 100 to 2000 cfu/100 ml | ND |

ND: not detectable

Example 2

In Example 1, the flux was set to 20 m/day, and filtration and backwashing were performed under the following operating condition: one backwash process was performed every time the filtration process was performed for one hour.

A change in the transmembrane pressure difference during the filtration and backwashing was checked. Incidentally, operation was performed by adding 5000 mg of sand to a liter of seawater in Example, and by adding no sand to the seawater in Comparative Example. The results are shown in Table 2.

TABLE 2

|  | Example 2 | Comparative Example |
| --- | --- | --- |
| Transmembrane pressure difference 2 hours after the start of operation | 5 kPa | 8 kPa |
| Transmembrane pressure difference 4 hours after the start of operation | 23 kPa | 44 kPa |
| Transmembrane pressure difference 8 hours after the start of operation | 58 kPa | 78 kPa |
| Transmembrane pressure difference 12 hours after the start of operation | 73 kPa | 106 kPa |
| Transmembrane pressure difference 24 hours after the start of operation | 91 kPa | 128 kPa |

The invention claimed is:

1. A method for treating ship ballast water with a membrane comprising the steps of:
    performing a membrane separation step of taking in seawater in a port area in which a ship is anchored and separating a microorganism with a size equal to or greater than a predetermined size therefrom with a membrane filtration apparatus installed in or on a hull of the ship and having a filtration membrane module and
    performing a backwash step of separating a fouling substance attached to a membrane surface of the membrane filtration apparatus from the membrane surface by backwashing, wherein before membrane separation treatment is performed on the seawater in the membrane separation step, the method comprises a sand mixing step of mixing sand into the seawater.

2. The method for treating ship ballast water with a membrane according to claim 1, wherein in the sand mixing step, sand collected from the port area in which the ship is anchored is mixed into the seawater.

3. The method for treating ship ballast water with a membrane according to claim 2, wherein the sand contained in the water discharged after backwashing in the backwash step is sterilized by sterilization and is reused.

4. The method for treating ship ballast water with a membrane according to claim 1, wherein the filtration membrane module of the membrane filtration apparatus is a microfiltration membrane module.

5. The method for treating ship ballast water with a membrane according to claim 1, wherein the filtration membrane module of the membrane filtration apparatus is a pleated membrane module.

* * * * *